US009129596B2

(12) United States Patent
Tachibana et al.

(10) Patent No.: US 9,129,596 B2
(45) Date of Patent: Sep. 8, 2015

(54) APPARATUS AND METHOD FOR CREATING DICTIONARY FOR SPEECH SYNTHESIS UTILIZING A DISPLAY TO AID IN ASSESSING SYNTHESIS QUALITY

(75) Inventors: Kentaro Tachibana, Kanagawa-ken (JP); Masahiro Morita, Kanagawa-ken (JP); Takehiko Kagoshima, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/535,782

(22) Filed: Jun. 28, 2012

(65) Prior Publication Data

US 2013/0080155 A1 Mar. 28, 2013

(30) Foreign Application Priority Data

Sep. 26, 2011 (JP) ................................ P2011-209989

(51) Int. Cl.
*G06F 17/21* (2006.01)
*G10L 13/00* (2006.01)
*G10L 13/02* (2013.01)
(Continued)

(52) U.S. Cl.
CPC ................. *G10L 13/02* (2013.01); *G10L 13/06* (2013.01); *G10L 25/60* (2013.01)

(58) Field of Classification Search
CPC ............................ G06F 17/2735; G10L 13/08
USPC .......................................... 704/258, 266, 260
See application file for complete search history.

(56) References Cited

U.S. PATENT DOCUMENTS

2003/0028380 A1* 2/2003 Freeland et al. .............. 704/260
2006/0069548 A1* 3/2006 Matsuura ................... 704/200.1
2006/0224386 A1* 10/2006 Ikegami ........................ 704/260

(Continued)

FOREIGN PATENT DOCUMENTS

JP H05-40494 2/1993
JP 2004-341226 12/2004

(Continued)

OTHER PUBLICATIONS

Sako et al.; "A Study on Developing Acoustic Model Efficiently for HMM-Based Speech Synthesis", The Proceeding of Acoustical Society of Japan 2006 Meeting, pp. 189-190, (2006).

(Continued)

*Primary Examiner* — Farzad Kazeminezhad
(74) *Attorney, Agent, or Firm* — Finnegan, Henderson, Farabow, Garrett & Dunner, L.L.P.

(57) ABSTRACT

Apparatus for creating a dictionary for speech synthesis includes a sentence storage unit configured to store N sentences, a sentence display unit configured to selectively display a first sentence which is one of the N sentences, a recording unit configured to record each user speech, a necessity determination unit configured to make a determination of whether to create the dictionary, a dictionary creation unit configured to create the dictionary by utilizing the user speech, and a speech synthesis unit configured to convert a second sentence to a synthesized speech with the dictionary. The display unit is configured to stop displaying the currently displayed sentence according to an evaluation of a quality of its synthesis. The determination unit makes the determination under a condition that the recording unit records the user speech of M first sentences (M is less than N) and the determination is based on at least one of an instruction from the user, M and an amount of the recorded user speech.

9 Claims, 5 Drawing Sheets

(51) Int. Cl.
*G10L 13/06* (2013.01)
*G10L 25/60* (2013.01)

(56) References Cited

U.S. PATENT DOCUMENTS

| | | | | |
|---|---|---|---|---|
| 2007/0078656 | A1* | 4/2007 | Niemeyer et al. | 704/260 |
| 2007/0239455 | A1 | 10/2007 | Groble et al. | |
| 2008/0120093 | A1* | 5/2008 | Izumida et al. | 704/10 |
| 2008/0288256 | A1* | 11/2008 | Agapi et al. | 704/260 |
| 2009/0228271 | A1* | 9/2009 | DeSimone | 704/231 |

FOREIGN PATENT DOCUMENTS

| | | |
|---|---|---|
| JP | 2007-225999 | 9/2007 |
| JP | 2009-216724 | 9/2009 |

OTHER PUBLICATIONS

Office Action for Chinese Patent Application No. 201210058572.6, issued Dec. 16, 2014, and partial English translation thereof (6 pages).

Office Action for Japanese Patent Application No. 2011-209989, issued Dec. 9, 2014, and partial English translation thereof (12 pages).

Ogata, et al., "Acoustic Model Training Based on Liner [sic] Transformation and MAP Modification for Average-Voice-Based Speech Synthesis," IEICE Technical Report. vol. 106, No. SP2006-84, pp. 49-54, 2006 (6 pages).

First Notice of Office Action issued by the State Intellectual Property Office of the People's Republic of China on Apr. 4, 2014, for Chinese Patent Application No. 2012100585726, and English-language translation thereof.

* cited by examiner

APPARATUS AND METHOD FOR CREATING DICTIONARY FOR SPEECH SYNTHESIS UTILIZING A DISPLAY TO AID IN ASSESSING SYNTHESIS QUALITY

CROSS-REFERENCE TO RELATED APPLICATION

This application is based upon and claims the benefit of priority from Japanese Patent Application No. 2011-209989 filed on Sep. 26, 2011, the entire contents of which are incorporated herein by reference.

FIELD

Embodiments described herein relate generally to an apparatus and a method for creating a dictionary for speech synthesis.

BACKGROUND

Speech synthesis is a technique to convert any text containing sentences to synthesized speech. In order to realize speech quality of a user, a system creates a user-customized dictionary for speech synthesis by utilizing a large amount of user speech.

The system collects and records the user speech of all predefined number of texts before creating the user-customized dictionary. Therefore, it is unable to check quality of synthesized speech in the process of recording. It forces the user to continue to utter texts despite the quality of synthesized speech being high enough.

BRIEF DESCRIPTION OF THE DRAWINGS

A more complete appreciation of the invention and many of the attendant advantages thereof will be readily obtained as the same become better understood by reference to the following detailed description when considered in connection with the accompanying drawings, wherein.

DETAILED DESCRIPTION

Figure 1:
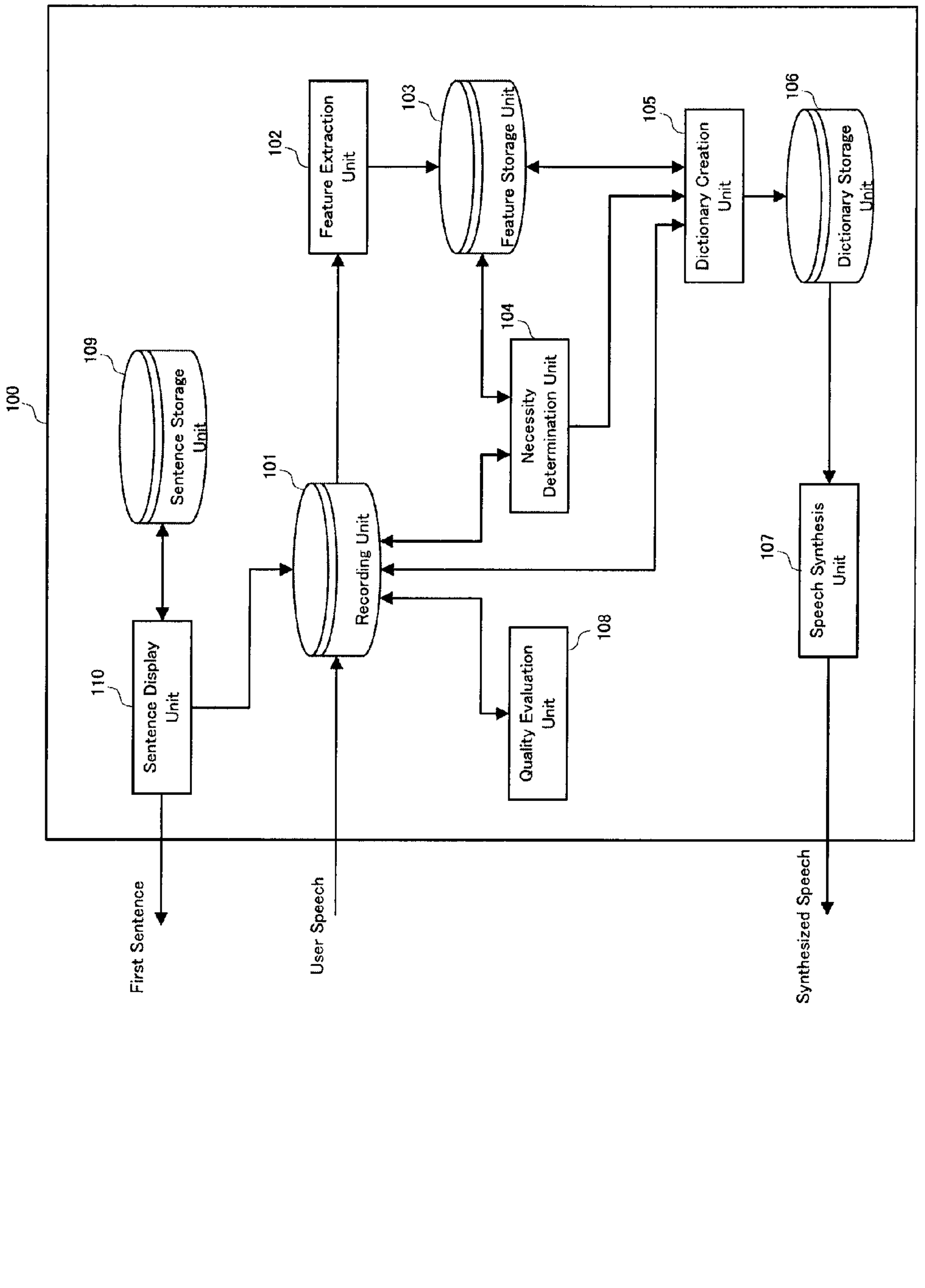
FIG. 1 is a block diagram of an apparatus for creating a dictionary for speech synthesis according to a first embodiment.

According to one embodiment, an apparatus for creating a dictionary for speech synthesis comprises a recording unit, a feature extraction unit, a feature storage unit, a necessity determination unit, a dictionary creation unit, a dictionary storage unit, a speech synthesis unit, a quality evaluation unit, a sentence storage unit and a sentence display unit. The sentence storage unit stores N sentences. The sentence display unit selectively displays a first sentence which is one of the N sentences. The recording unit records each user speech corresponding to each first sentence. The feature extraction unit extracts features from both recorded user speech and the first sentence corresponding to the recorded user speech. The feature storage unit stores the features. The necessity determination unit makes a determination of whether it needs to create a dictionary. The dictionary creation unit creates the dictionary by utilizing the recorded user speech and the first sentence corresponding to the recorded user speech when the necessity determining unit makes the determination that it needs to create the dictionary. The dictionary storage unit stores the dictionary. The speech synthesis unit converts a second sentence to a synthesized speech by utilizing the dictionary. The quality evaluation unit evaluates sound quality of the synthesized speech. The necessity determination unit makes the determination under a condition that the recording unit records the user speech of M first sentences (M is counting number and less than N), that is before the recording unit finishes recording the user speech of all N sentences. The determination is based on at least one of an instruction from the user, M, and an amount of the recorded user speech. In the case that the quality evaluation unit evaluates that the sound quality of the synthesized speech has reached to a certain high quality, the sentence display unit stops displaying the first sentence and the recording unit stops recording the user speech.

Various embodiments will be described hereinafter with reference to the accompanying drawings, wherein the same reference numeral designations represent the same or corresponding parts throughout the several views.

The first Embodiment

In the first embodiment, an apparatus for creating a dictionary for speech synthesis records a user speech corresponding to a sentence, and creates a user-customized dictionary for the user by utilizing the user speech. The user-customized dictionary enables the apparatus to convert any sentences to synthesized speech with speech quality of the user.

FIG. 1 is a block diagram of an apparatus 100 for creating a dictionary for speech synthesis. The apparatus 100 of FIG. 1 comprises a recording unit 101, a feature extraction unit 102, a feature storage unit 103, a necessity determination unit 104, a dictionary creation unit 105, a dictionary storage unit 106, a speech synthesis unit 107, a quality evaluation unit 108, a sentence storage unit 109 and a sentence display unit 110.

The sentence storage unit 109 stores N sentences. Each sentence is prepared in advance to prompt a user to utter and N is the total number of sentences. The sentence display unit 110 selectively displays a first sentence which is one of the N sentences. The recording unit 101 records each user speech corresponding to each first sentence. The feature extraction unit 102 extracts features from both recorded user speech and the first sentence corresponding to the recorded user speech. The feature storage unit 103 stores the features. The necessity determination unit 104 makes a determination of whether it needs to create a dictionary. The dictionary creation unit 105 creates the dictionary by utilizing the recorded user speech and the first sentences corresponding to the recorded user speech when the necessity determining unit 104 makes the determination that it needs to create the dictionary. The dictionary storage unit 106 stores the dictionary. The speech synthesis unit 107 converts a second sentence to a synthesized speech by utilizing the dictionary. The quality evaluation unit 108 evaluates sound quality of the synthesized speech.

The necessity determination unit 104 makes the determination under a condition that the recording unit 101 records the user speech of M first sentences (M is counting number and less than N), that is before the recording unit 101 finishes recording the user speech of all N sentences. The determination is based on at least one of an instruction from the user, M, and an amount of the recorded user speech.

In the case that the quality evaluation unit 108 evaluates that the sound quality of the synthesized speech has reached a certain high quality, the sentence display unit 110 stops displaying the first sentence and the recording unit 101 stops recording the user speech.

In this way, the apparatus 100 according to the first embodiment creates the dictionary based on the determination by the necessity determination unit 104 even when the recording of the user speech has not finished. Accordingly, the user can preview the synthesized speech created by the dictionary before finishing utterance of all N sentences prepared in advance.

Furthermore, the apparatus stops recording the user speech when the synthesized speech has reached a certain high quality. Accordingly, it can avoid imposing excessive burdens of uttering on the user and improve the efficiency of dictionary creation.

(Hardware Component)

Figure 2:
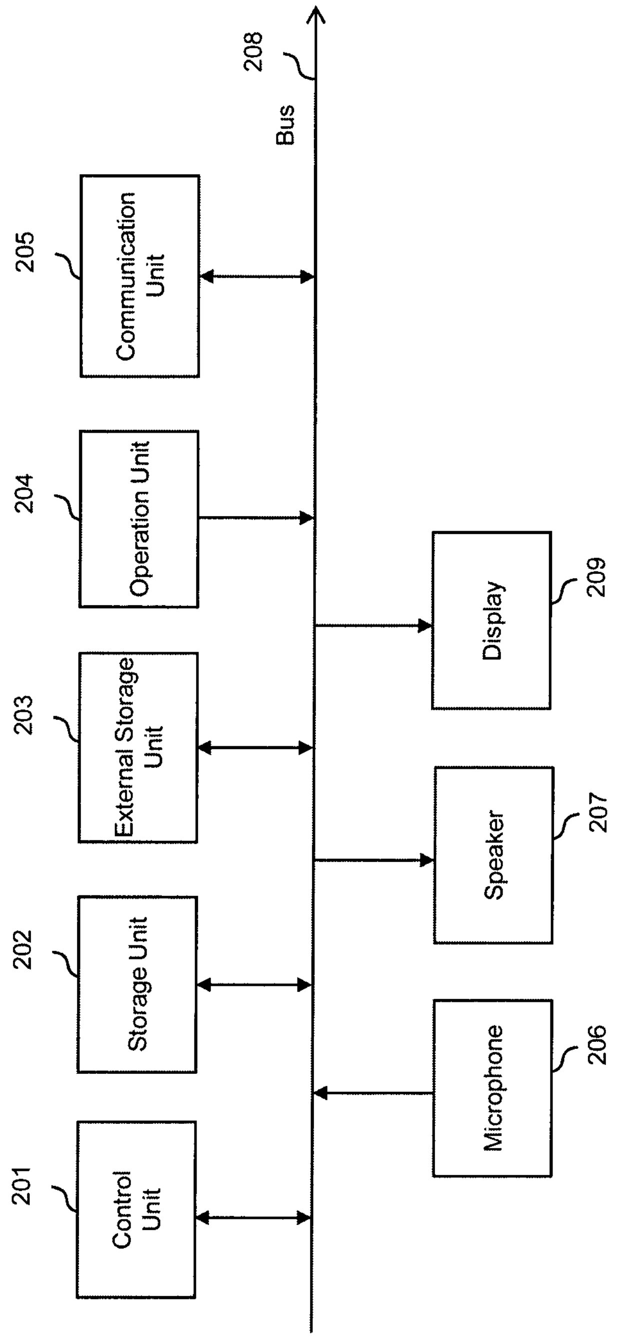
FIG. 2 is a system diagram of a hardware component of the apparatus in FIG. 1.

The apparatus 100 is composed of hardware using a regular computer shown in FIG. 2. This hardware comprises a control unit 201 such as a CPU (Central Processing Unit) to control the entire apparatus, a storage unit 202 such as a ROM (Read Only Memory) and/or a RAM (Random Access Memory) to store various kinds of data and programs, an external storage unit 203 such as a HDD (Hard Access Memory) and/or a CD (Compact Disk) to store various kinds of data and programs, an operation unit 204 such as a keyboard, a mouse, and/or a touch screen to accept a user's indication, a communication unit 205 to control communication with an external apparatus, a microphone 206 to which speech is input, a speaker 207 to output synthesized speech, a display 209 to display a image and a bus 208 to connect the hardware elements.

In such hardware, the control unit 201 executes various programs stored in the storage unit 202 (such as the ROM) and/or the external storage unit 203. As a result, the following functions are realized.

(The Sentence Storage Unit)

The sentence storage unit 109 stores N sentences. Each sentence is prepared in advance to prompt a user to utter and N is the total number of sentences. The sentence storage unit 109 is composed of the storage unit 202 or the external storage unit 203. The N sentences are created in consideration of previous and next unit environment, prosody information which can be extracted by morphological analysis of a sentence, and the coverage of the number of morae in the accent phrase, accent type and linguistic information. It makes it possible to create a dictionary with high sound quality even when N is small.

(The Sentence Display Unit)

The sentence display unit 110 displays a first sentence to the user. The first sentence is selected from the N sentences stored in the sentence storage unit 109 in series. The sentence display unit 110 utilizes the display 209 for displaying the first sentence to the user. The sentence display unit 110 according to this embodiment can stop displaying the first sentence when a synthesized speech created by the speech synthesis unit 107 has reached a certain high quality.

The sentence display unit 110 can select the first sentence from the N sentences in the order in which phoneme is not overlapped. The sentence display unit 110 selects all N sentences as the first sentence except the case that the quality evaluation unit 108 evaluates that sound quality of the synthesized speech has reached a certain high quality. Moreover, the sentence display unit 110 can preferentially select the first sentence which is easy to utter for the user.

(The Recording Unit)

The recording unit 101 records each user speech corresponding to each first sentence. The recording unit 101 is composed of the storage unit 202 or the external storage unit 203. The user speech is linked to the corresponding first sentence in the recording unit 101. The user speech is obtained by microphone 206. The recording unit 101 according to this embodiment stops recording the user speech when a synthesized speech created by the speech synthesis unit 107 has reached a certain high quality.

The recording unit 101 observes a recording condition of the user speech and it does not record the user speech when the recording condition is determined to be inappropriate. For example, the recording unit 101 calculates average power and a length of the user speech, and determines that the recording condition is inappropriate when the average power or the length is less than a predefined threshold. By utilizing the user speech recorded in the appropriate recording condition, it is possible to improve quality of the dictionary created by the dictionary creation unit 105.

(The Feature Extraction Unit)

The feature extraction unit 102 extracts features from both the recorded user speech and the first sentence corresponding to the recorded user speech. In particular, the feature extraction unit 102 extracts prosody information with respect to the recorded user speech or a speech unit. The speech unit is such as word and syllable. The prosody information is such as cepstrum, vector-quantized data, fundamental frequency (F0), power and duration time.

Additionally, the feature extraction unit 102 extracts both phonemic label information and linguistic attribute information from pronunciation and accent type of the first sentence.

(The Feature Storage Unit)

The feature storage unit 103 stores the features extracted by the feature extraction unit 102 such as the prosody information, the phonemic label information and linguistic attribute information. The feature storage unit 103 is composed of the storage unit 202 or the external storage unit 203.

(The Necessity Determination Unit)

The necessity determination unit 104 makes a determination of whether it needs to create a dictionary. It makes the determination under a condition that the recording unit 101 records the user speech of M first sentences (M is counting number and less than N), that is before the recording unit 101 finishes recording the user speech of all N sentences. The determination is based on at least one of an instruction from the user, M and an amount of the recorded user speech on the recording unit 101.

In the case of the instruction from the user, the necessity determination unit 104 makes the determination based on a predefined operation by the user obtained via the operation unit 204. For example, the necessity determination unit 104 can make the determination that it needs to create the dictionary (the determination of "necessity") when a predefined button is actuated by the user.

In the case of M, the necessity determination unit 104 makes the determination that it needs to create the dictionary when M exceeds a predefined threshold. In the case that the predefined threshold is set to 50, for example, the necessity determination unit 104 makes the determination of "necessity" when M exceeds 50. Furthermore, the necessity determination unit 104 can make the determination of "necessity" every time when M increases by a predefined number. In the case that the predefined number is set to five, for example, the necessity determination unit 104 makes the determination of "necessity" when M becomes multiples of five such as 5, 10 and 15.

In the case of the amount of the recorded user speech, the necessity determination unit 104 makes the determination that it needs to create the dictionary when the amount exceeds a predefined threshold. The amount is measured by such as a total time length of the recorded user speech and memory size occupied by recorded the user speech. In the case that the predefined threshold is set to five minutes, the necessity determination unit 104 makes the determination of "necessity" when the total time length of the recorded user speech exceeds five minutes. Furthermore, the necessity determination unit 104 can make the determination of "necessity" every time when the amount increases by a predefined amount. In the case that the predefined amount is set to one minute, for example, the necessity determination unit 104 makes the determination of "necessity" every time when the total length increases by one minute.

Furthermore, the necessity determination unit 104 can make the determination based on an amount of the features stored in the feature storage unit 103.

In this way, the necessity determination unit 104 according to the first embodiment makes a determination even when the recording of the user speech has not finished. Accordingly, the dictionary creation unit 105 creates a dictionary before the user finishes uttering all N sentences.

(The Dictionary Creation Unit 105)

The dictionary creation unit 105 creates the dictionary by utilizing the features stored in the feature storage unit 103 when the necessity determining unit 104 makes the determination that it needs to create the dictionary. The dictionary creation unit 105 creates the dictionary every time when the necessity determining unit 104 makes the determination of "necessity". In this way, the dictionary storage unit 106 discussed later can always store the latest dictionary.

There have been an adaptive algorithm and a training algorithm as a method for creating a dictionary. The adaptive algorithm is a method to update an existing universal dictionary to a user-customized dictionary by utilizing the extracted features. The training algorithm is a method to create a user-customized dictionary from scratch by utilizing the extracted features.

Generally, the adaptive algorithm can create the user-customized dictionary with a small amount of features. The training algorithm can create the user-customized dictionary with high quality when a large amount of features is available. Therefore, the dictionary creation unit 105 can select the adaptive algorithm when the amount of the features stored in the feature storage unit 103 is less than or equal to a predefined threshold. On the other hand, it can select the training algorithm when the amount is larger than the predefined threshold. Moreover, the dictionary creation unit 105 can select the method based on M or the amount of the recorded user speech. For example, it can set the predefined threshold to 50 sentences, and select the adaptive algorithm when M is less than or equal to 50.

In the case that a method for speech synthesis is based on concatenative speech synthesis, the dictionary is composed of a prosody generation data for controlling prosody and a waveform generation data for controlling sound quality. These two kinds of dictionaries are created with different methods. For example, the prosody generation data and the waveform generation data can be created by the adaptive and training algorithms respectively. In the case that the method for speech synthesis is a statistical approach such as an HMM-based one, it is possible to create a user-customized dictionary in a short time with the adaptive algorithm.

In this way, the dictionary creation unit 105 switches the methods for creating a dictionary based on at least one of the amount of the features, M and the amount of the recorded user speech. Accordingly, it is possible to create the dictionary by utilizing an appropriate method with the progress of recording.

(The Dictionary Storage Unit)

The dictionary storage unit 106 stores the dictionary created by the dictionary creation unit 105. The dictionary storage unit 106 is composed of the storage unit 202 or the external storage unit 203.

(The Speech Synthesis Unit)

The speech synthesis unit 107 converts a second sentence to a synthesized speech by utilizing the dictionary stored in the dictionary storage unit 106. It obtains an instruction from the user via the operation unit 204, and starts to convert the second sentence to the synthesized speech. The synthesized speech is outputted through the speaker 207. In this embodiment, the contents of the second sentence can be set to a sentence which is hard for the speech synthesis unit 107 to convert.

Moreover, the speech synthesis unit 107 can determine the necessity of the conversion based on at least one of the amount of the features, M and the amount of the recorded user speech. For example, it can convert the second sentence to the synthesized speech every time when M increases by ten sentences or the amount of the recorded user speech increases by ten minutes. Moreover, it can convert it every time when a new dictionary is stored in the dictionary storage unit 106.

(The Quality Evaluation Unit)

The quality evaluation unit 108 evaluates sound quality of the synthesized speech by the speech synthesis unit 107. When the sound quality has reached a certain high quality, it can send a signal for the sentence display unit 110 to stop displaying the first sentence and a signal for the recording unit 101 to stop recording the user speech.

The quality evaluation unit 108 according to this embodiment obtains an evaluation from a user who previews the synthesized speech. It can be obtained via the operation unit 204. For example, if the user judges the sound quality of the synthesized speech has reached a certain high quality, the quality evaluation unit 108 obtains the user's evaluation via the operation unit 204, and sends a signal to stop recording the user speech.

In this way, the quality evaluation unit 108 sends a signal to stop recording the user speech when the synthesized speech has reached to a certain high quality. Accordingly, it can avoid imposing excessive burdens of uttering on the user and improve the efficiency of dictionary creation.

(Flow Chart)

Figure 3:
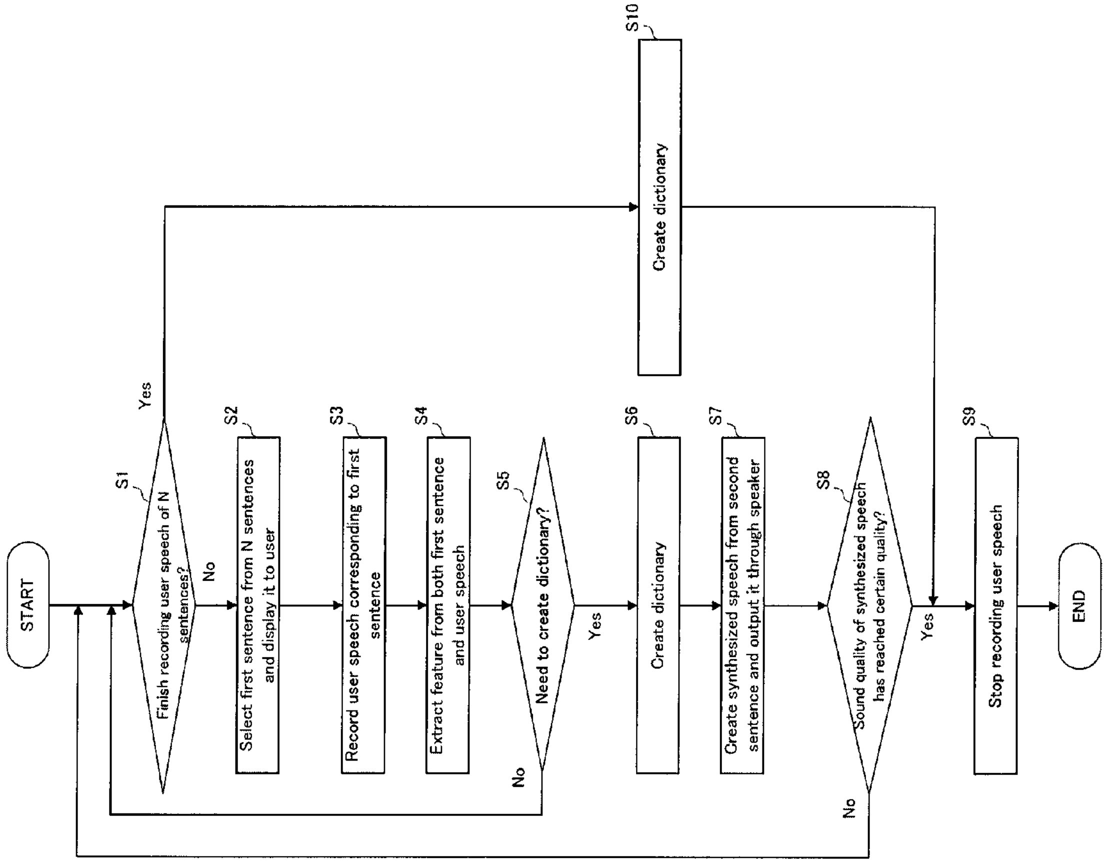
FIG. 3 is a system diagram of a flow chart illustrating processing of the apparatus according to the first embodiment.

FIG. 3 is a flow chart of processing of the apparatus 100 for creating a dictionary for speech synthesis in accordance with the first embodiment.

At S1, the apparatus 100 judges whether the recording of the user speech of all N sentences is finished. In the case of "finished", it goes to S10 and creates a dictionary. Otherwise, it goes to S2. In the initial state of the recording, it always goes to S2.

At S2, the sentence display unit 110 displays the first sentence to the user. The first is selected from the N sentences stored in the sentence storage unit 109.

At S3, the recording unit 101 records each user speech corresponding to each first sentence. The user speech is linked to the corresponding first sentence in the recording unit 101. This step checks recording condition of the user speech as well.

At S4, the feature extraction unit 102 extracts features from both the recorded user speech and the first sentence corresponding to the recorded user speech. And, it stores the features in the feature storage unit 103.

At S5, the necessity determination unit 104 makes a determination of whether it needs to create a dictionary. The determination is based on at least one of an instruction from the user, M and an amount of the recorded user speech. In the case that the necessity determination unit 104 determines to create a dictionary, it goes to the S6. Otherwise, it goes to the S1 and continues to record the user speech.

At S6, the dictionary creation unit 105 creates a dictionary by utilizing the features stored in the feature storage unit 103. The dictionary is stored in the dictionary storage unit 106.

At S7, the speech synthesis unit converts a second sentence to a synthesized speech, and outputs the synthesized speech through the speaker 207.

At S8, the quality evaluation unit 108 evaluates sound quality of the synthesized speech. When it obtains an evaluation from the user who previews the synthesized speech that the sound quality has reached a certain high quality, it goes to S9. Otherwise, it goes to the S1, and continues to record the user speech.

At S9, the apparatus 100 stops recording the user speech.

(Interface)

Figure 4:
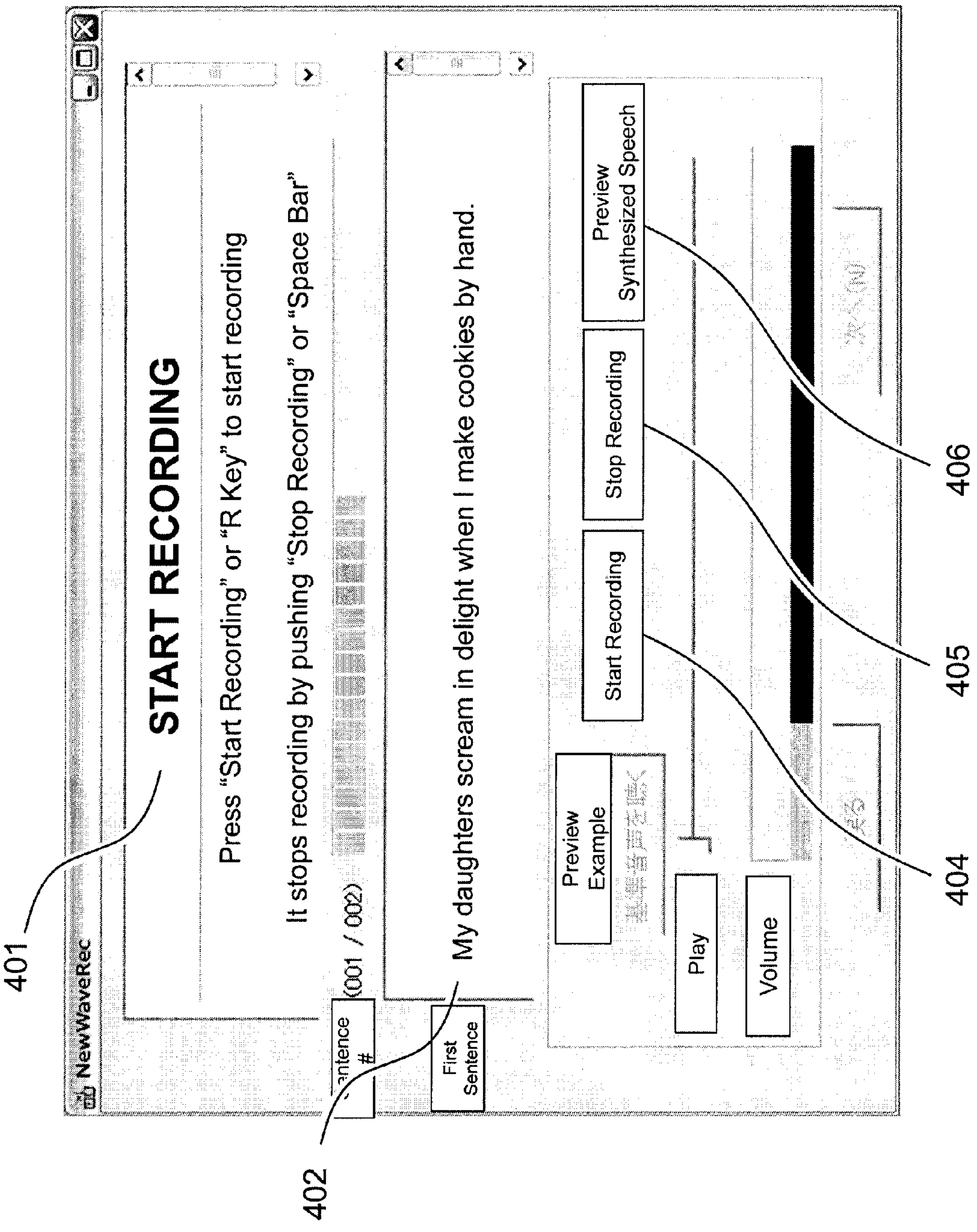
FIG. 4 is an interface of the apparatus according to the first embodiment.

FIG. 4 is an interface of the apparatus 100 according to the first embodiment.

In FIG. 4, 402 is a field to show a first sentence to a user. The first sentence is selected by the sentence display unit 110. The apparatus 100 starts recording the user speech of the first sentence when the user pushes a start recording button 404. And, the recording unit 101 judges a recording condition of the user speech. In this example, the recording condition is judged to be inappropriate when at least one of the following criteria is satisfied.

1. The average power of speech segment becomes less than a predefined threshold.
2. The maximum of short power of the user speech becomes more than a predefined threshold. Or, the minimum of short power of speech segment becomes less than a predefined threshold.
3. The time length of the user speech is less than a predefined length such as 20 msec.

In other cases, the recording condition is judged to be appropriate.

When the recording condition is judged to be inappropriate, the apparatus 100 notifies it to the user. For example, it can show a message such as "Turn up microphone or recording device" through field 401 in FIG. 4.

When the user pushes a preview button 406, the speech synthesis unit 107 creates a synthesized speech by utilizing the dictionary store in the dictionary storage unit 106, and outputs it through the speaker 207.

In the case that the dictionary storage unit 106 stores no dictionaries when the preview button 406 is pushed by the user, the necessity determination unit 104 makes the determination of "necessity" and the dictionary creation unit creates the dictionary. And, after creating the dictionary, the speech synthesis unit 107 converts a second sentence to a synthesized speech.

The user can preview the synthesized speech through the speaker 207, and push a stop recording button 405 when the sound quality of the synthesized speech has reached to a certain high quality. In this way, the apparatus 100 stops recording the user speech. In the case of continuing the recording, the apparatus 100 shows the next first sentence to the field 402.

The Second Embodiment

Figure 5:
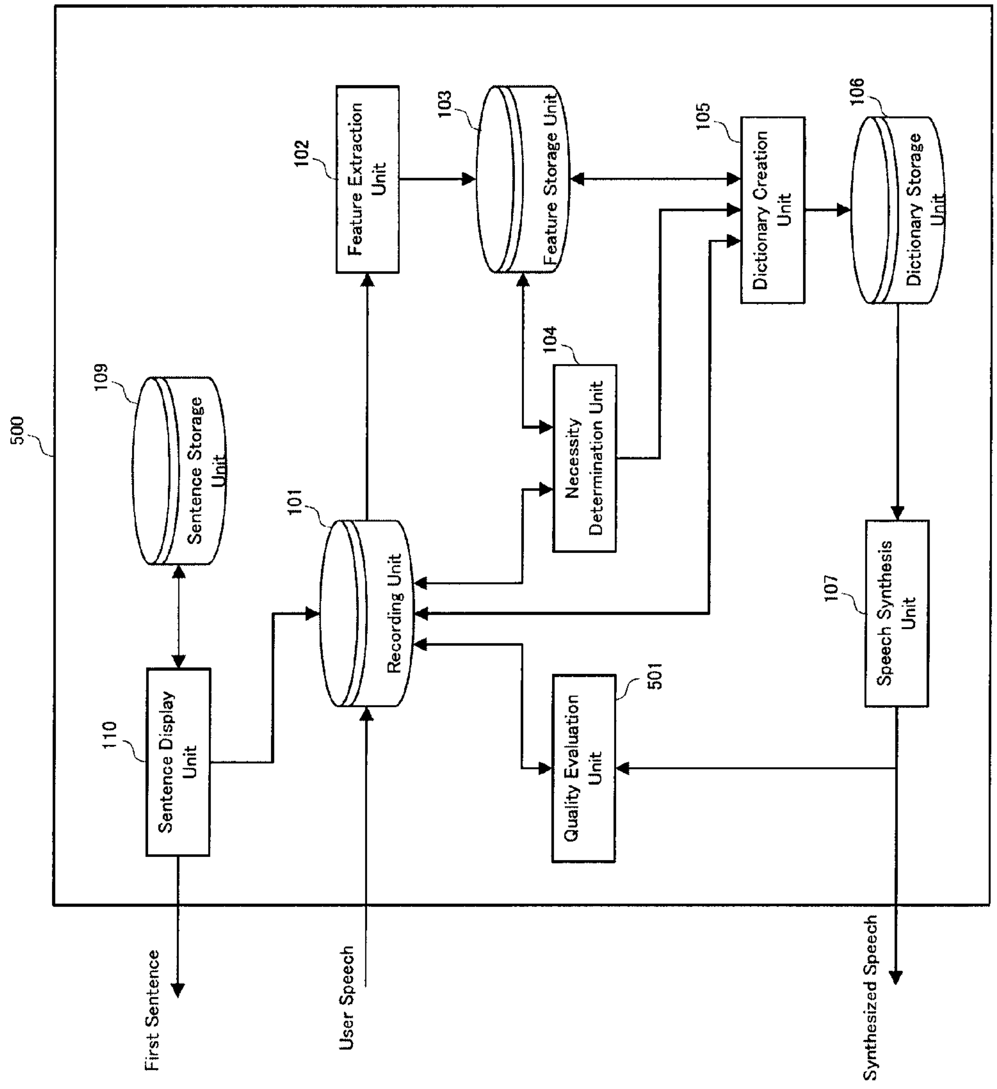
FIG. 5 is a block diagram of an apparatus for creating a dictionary for speech synthesis according to a second embodiment.

FIG. 5 is a block diagram of an apparatus 500 for creating dictionary for speech synthesis according to the second embodiment. The second embodiment is different from the first embodiment in that a quality evaluation unit 501 evaluates sound quality of the synthesized speech based on a similarity between the synthesized speech and the recorded user speech corresponding to the second sentence.

Here, the second sentence is selected from N sentences corresponding to the recorded user speech. The quality evaluation unit 501 calculates the similarity between the user speech of the first sentence and the synthesized speech of the second sentence, which is the same as the first sentence. By utilizing the same sentence between the recorded user speech and the synthesized speech, it is possible to evaluate the similarity excluding the differences of the contents of utterances. The higher similarity means that the sound quality of the synthesized speech becomes close to the sound quality of the recorded user speech which is uttered by the user.

The quality evaluation unit 501 utilizes spectral distortion between the recorded user speech and the synthesized speech and square error of F0 patterns of them as the similarity. If the spectral distortion or the square error is equal to or more than a predefined threshold (it means the similarity is low), it continues to record the user speech because the quality of the created dictionary is not enough. On the other hand, if they are less than the predefined threshold (it means the similarity is high), it stops recording the user speech because the quality of the created dictionary is high enough.

In this embodiment, the quality evaluation unit 501 evaluates the quality of the synthesized speech by utilizing the similarity which is one of objective criteria. Due to the difference of the route of transmission, the user could judge there is difference between the user speech to which the user listens during uttering and the user speech outputted through a speaker. By utilizing the objective criterion such as the similarity, it is possible to evaluate the sound quality of the synthesized speech correctly. It makes it possible to judge the necessity of dictionary creation correctly, and results in improving the efficiency of dictionary creation.

(Variation)

The first sentence can be composed of more than two sentences. In short, the sentence display unit 110 can display texts including more than two sentences to the user. The sentence storage unit 109 can also store the texts.

Moreover, the necessity determination unit 104 can make the determination by utilizing only the user speech recorded in an appropriate recording condition judged by the recording unit 101. In short, the necessity determination unit 104 can make the determination based on the number of first sentences which are recorded in the appropriate recording condition or the amount of the user speech which are recorded in the appropriate recording condition.

(Effect)

According to the apparatus for creating a dictionary for speech synthesis of at least one of the embodiments described above, it creates the dictionary based on the determination by the necessity determination unit 104 even when the recording of the user speech has not finished. Accordingly, the user can preview the synthesized speech created by the dictionary before finishing utterance of all N sentences prepared in advance.

Furthermore, the apparatus of at least one of the embodiments described above stops recording the user speech when the synthesized speech has reached a certain high quality. Accordingly, it can avoid imposing excessive burdens of uttering on the user and improve the efficiency of dictionary creation.

In the disclosed embodiments, the processing can be performed by a computer program stored in a computer-readable medium.

In the embodiments, the computer readable medium may be, for example, a magnetic disk, a flexible disk, a hard disk, an optical disk (e.g., CD-ROM, CD-R, DVD), an optical magnetic disk (e.g., MD). However, any computer readable medium, which is configured to store a computer program for causing a computer to perform the processing described above, may be used.

Furthermore, based on an indication of the program installed from the memory device to the computer, OS (operation system) operating on the computer, or MW (middle ware software), such as database management software or network, may execute one part of each processing to realize the embodiments.

Furthermore, the memory device is not limited to a device independent from the computer. By downloading a program transmitted through a LAN or the Internet, a memory device in which the program is stored is included. Furthermore, the memory device is not limited to one. In the case that the processing of the embodiments is executed by a plurality of memory devices, a plurality of memory devices may be included in the memory device.

A computer may execute each processing stage of the embodiments according to the program stored in the memory device. The computer may be one apparatus such as a personal computer or a system in which a plurality of processing apparatuses are connected through a network. Furthermore, the computer is not limited to a personal computer. Those skilled in the art will appreciate that a computer includes a processing unit in an information processor, a microcomputer, and so on. In short, the equipment and the apparatus that can execute the functions in embodiments using the program are generally called the computer.

While certain embodiments have been described, these embodiments have been presented by way of examples only, and are not intended to limit the scope of the invention. Indeed, the novel embodiments described herein may be embodied in a variety of other forms, furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. An apparatus for creating a dictionary for speech synthesis, comprising:

a sentence storage unit configured to store N sentences where N is a counting number, each sentence being prepared in advance to prompt a user to utter;

a sentence display unit configured to selectively display at least one first sentence, each first sentence being one of the N sentences;

a recording unit configured to record each user speech corresponding to each first sentence;

a necessity determination unit, under a condition that the recording unit records the user speech of M first sentences, M being a counting number less than N, configured to make a determination of whether to create the dictionary based on at least one of an instruction from the user, the counting number M, and an amount of the user speech recorded;

a dictionary creation unit configured to create the dictionary by utilizing the user speech and the first sentences corresponding to the user speech when the necessity determining unit makes the determination that the dictionary creation unit needs to create the dictionary;

a speech synthesis unit configured to convert a second sentence, which is the same as the displayed at least one first sentence, to a synthesized speech by utilizing the dictionary; and a quality evaluation unit configured to evaluate a sound quality of the synthesized speech, wherein the sentence display unit is configured to stop displaying the currently displayed at least one first sentence when the quality evaluation unit evaluates that the sound quality of the synthesized speech has reached a certain high quality.

2. The apparatus according to claim 1, wherein the recording unit stops recording the user speech when the quality evaluation unit evaluates that the sound quality of the synthesized speech has reached a certain high quality.

3. The apparatus according to claim 2, wherein the quality evaluation unit is configured to obtain an evaluation of the sound quality of the synthesized speech from a user who previews the synthesized speech.

4. The apparatus according to claim 1, wherein the second sentence is one of the N sentences, and the quality evaluation unit evaluates the sound quality of the synthesized speech based on a similarity between the synthesized speech and user speech corresponding to the second sentence.

5. An apparatus for creating a dictionary for speech synthesis, comprising:

a sentence storage unit configured to store N sentences where N is a counting number, each sentence being prepared in advance to prompt a user to utter;

a sentence display unit configured to selectively display at least one first sentence, each first sentence being one of the N sentences;

a recording unit configured to record each user speech corresponding to each first sentence;

a necessity determination unit, under a condition that the recording unit records the user speech of M first sentences, M being a counting number less than N, configured to make a determination of whether to create the dictionary based on at least one of an instruction from the user, the counting number M, and an amount of the user speech recorded;

a dictionary creation unit configured to create the dictionary by utilizing the user speech and the first sentences corresponding to the user speech when the necessity determining unit makes the determination that the dictionary creation unit needs to create the dictionary; and a speech synthesis unit configured to convert a second sentence, which is the same as the displayed at least one first sentence, to a synthesized speech by utilizing the dictionary, wherein the dictionary creation unit is configured to select an algorithm between an adaptive algorithm and a training algorithm based on the counting number M or the amount of the user speech recorded and to create the dictionary with the selected algorithm;

wherein the sentence display unit is configured to stop displaying the currently displayed at least one first sentence when the quality evaluation unit evaluates that the sound quality of the synthesized speech has reached a certain high quality.

6. An apparatus for creating a dictionary for speech synthesis, comprising:

a sentence storage unit configured to store N sentences where N is a counting number, each sentence being prepared in advance to prompt a user to utter;

a sentence display unit configured to selectively display at least one first sentence, each first sentence being one of the N sentences;

a recording unit configured to record each user speech corresponding to each first sentence;

a necessity determination unit, under a condition that the recording unit records the user speech of M first sentences, M being a counting number less than N, configured to make a determination of whether to create the dictionary based on at least one of an instruction from the user, the counting number M, and an amount of the user speech recorded;

a dictionary creation unit configured to create the dictionary by utilizing the user speech and the first sentences corresponding to the user speech when the necessity determining unit makes the determination that the dictionary creation unit needs to create the dictionary;

a speech synthesis unit configured to convert a second sentence, which is the same as the displayed at least one first sentence, to a synthesized speech by utilizing the dictionary, wherein the recording unit judges a recording condition of the user speech, and records the user speech when the recording condition of the user speech is judged to be appropriate;

wherein the sentence display unit is configured to stop displaying the currently displayed at least one first sentence when the quality evaluation unit evaluates that the sound quality of the synthesized speech has reached a certain high quality.

7. A method for creating a dictionary for speech synthesis, the method comprising:

displaying at least one first sentence to a user, each first sentence being selected from N sentences in series where N is a counting number, the N sentences being stored in a sentence storage unit;

recording each user speech corresponding to each first sentence;

making a determination of whether to create the dictionary under a condition that the user speech of M first sentences is recorded, M being a counting number less than N, the determination being based on at least one of an instruction from the user, the counting number M, and an amount of the user speech being recorded;

creating the dictionary by utilizing the user speech and the first sentences corresponding to the user speech when the determination to create the dictionary is made;

converting, using a computer, a second sentence, which is the same as the displayed at least one first sentence, to a synthesized speech by utilizing the dictionary;

evaluating a sound quality of the synthesized speech; and stopping the displaying of the currently displayed at least one first sentence when the evaluated sound quality of the synthesized speech has reached a certain high quality.

8. A method for creating a dictionary for speech synthesis, the method comprising:

displaying at least one first sentence to a user, the first sentence being selected from N sentences in series where N is a counting number, the N sentences being stored in a sentence storage unit;

recording each user speech corresponding to each first sentence;

making a determination of whether to create the dictionary under a condition that the user speech of M first sentences is recorded, M being a counting number less than N, the determination being based on at least one of an instruction from the user, the counting number M, and an amount of the user speech being recorded;

selecting an algorithm between an adaptive algorithm and a training algorithm based on the counting number M or the amount of the user speech recorded;

creating the dictionary with the selected algorithm by utilizing the user speech and the first sentences corresponding to the user speech when the determination to create the dictionary is made; and converting, using a computer, a second sentence, which is the same as the displayed at least one first sentence, to a synthesized speech by utilizing the dictionary;

and stopping the displaying of the currently displayed at least one first sentence when the evaluated sound quality of the synthesized speech has reached a certain high quality.

9. A method for creating a dictionary for speech synthesis, the method comprising:

displaying at least one first sentence to a user, the first sentence being selected from N sentences in series where N is a counting number, the N sentences being stored in a sentence storage unit;

judging a recording condition of user speech when the recording condition of the user speech is judged to be appropriate;

recording each user speech corresponding to each first sentence;

making a determination of whether to create the dictionary under a condition that the user speech of M first sentences is recorded, M being a counting number less than N, the determination being based on at least one of an instruction from the user, the counting number M, and an amount of the user speech being recorded;

creating the dictionary by utilizing the user speech and the first sentences corresponding to the user speech when the determination to create the dictionary is made; and converting, using a computer, a second sentence, which is the same as the displayed at least one first sentence, to a synthesized speech by utilizing the dictionary;

and stopping the displaying of the currently displayed at least one first sentence when the evaluated sound quality of the synthesized speech has reached a certain high quality.

* * * * *